(12) United States Patent
Ostergaard et al.

(10) Patent No.: US 9,723,537 B2
(45) Date of Patent: Aug. 1, 2017

(54) METHOD AND DEVICE FOR CONFIGURING A COMMUNICATION SYSTEM

(75) Inventors: Paul Frederick Norwood Ostergaard, Perth (AU); David Alexander Wilson, Perth (AU)

(73) Assignee: Norwood Systems Pty Ltd, Nedlands (AU)

( * ) Notice: Subject to any disclaimer, the term of this patent is extended or adjusted under 35 U.S.C. 154(b) by 72 days.

(21) Appl. No.: 14/232,688

(22) PCT Filed: Jul. 13, 2012

(86) PCT No.: PCT/AU2012/000849
§ 371 (c)(1),
(2), (4) Date: Jul. 18, 2014

(87) PCT Pub. No.: WO2013/006923
PCT Pub. Date: Jan. 17, 2013

(65) Prior Publication Data
US 2014/0341071 A1   Nov. 20, 2014

(30) Foreign Application Priority Data

Jul. 14, 2011 (AU) ................... 2011902814

(51) Int. Cl.
*H04W 40/24* (2009.01)
*H04W 24/02* (2009.01)
*H04L 29/08* (2006.01)
*H04M 3/24* (2006.01)
*H04L 12/24* (2006.01)
*H04W 8/26* (2009.01)
*H04W 84/16* (2009.01)
*H04M 3/42* (2006.01)

(52) U.S. Cl.
CPC ....... *H04W 40/244* (2013.01); *H04L 41/0886* (2013.01); *H04L 67/14* (2013.01); *H04M 3/241* (2013.01); *H04W 8/26* (2013.01); *H04W 24/02* (2013.01); *H04M 3/42263* (2013.01); *H04M 3/42314* (2013.01); *H04W 84/16* (2013.01)

(58) Field of Classification Search
CPC ...... H04W 84/16; H04W 24/02; H04L 29/02; H04L 41/08; H04M 3/42
See application file for complete search history.

(56) References Cited

U.S. PATENT DOCUMENTS

| 5,757,902 A | * | 5/1998 | Mitsuo | .................. H04M 1/725 |
| | | | | 379/207.06 |
| 6,272,496 B1 | * | 8/2001 | Lennert | ............. H04Q 3/54533 |
| 2009/0262733 A1 | * | 10/2009 | Olson | ..................... H04L 12/66 |
| | | | | 370/389 |

(Continued)

*Primary Examiner* — Lakeram Jangbahadur
(74) *Attorney, Agent, or Firm* — Suzannah K. Sundby, Esq.; Canady + Lortz LLP

(57) ABSTRACT

A method for configuring a communication system (20) comprising an exchange (34), the method comprising: identifying a type of the exchange; selecting a configuration module (56) adapted to communicate with the identified type of the exchange; and under the control of the selected configuration module, retrieving and analyzing automatically a configuration database from the exchange, and configuring the exchange to provide communication connectivity to both a fixed network and a mobile network.

34 Claims, 4 Drawing Sheets

(56) References Cited

U.S. PATENT DOCUMENTS

2010/0111079 A1\* 5/2010 Duffy .................. H04L 12/66
370/352
2012/0040615 A1\* 2/2012 Auriffeille ............ G06Q 10/10
455/41.2

\* cited by examiner

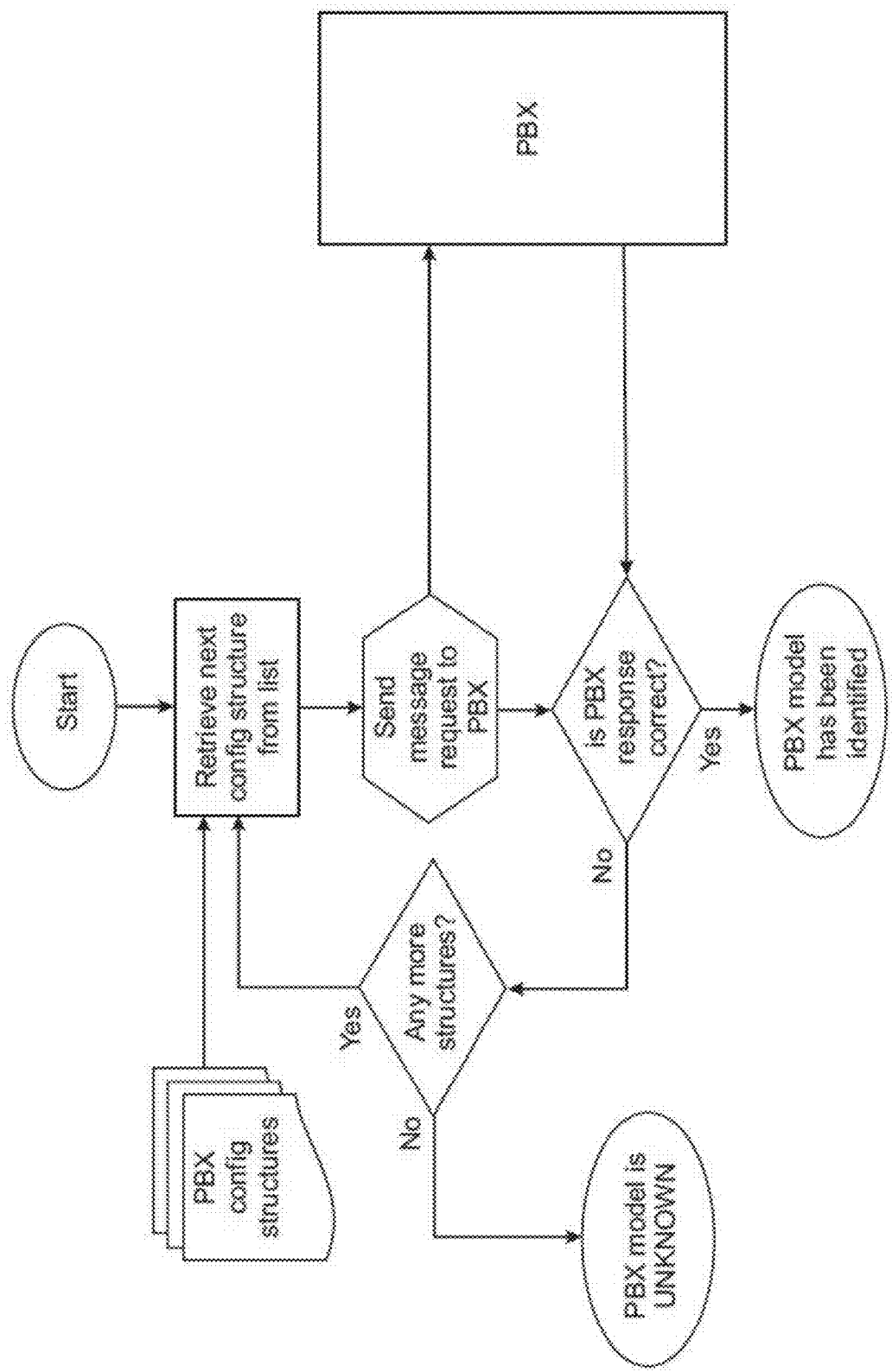

METHOD AND DEVICE FOR CONFIGURING A COMMUNICATION SYSTEM

RELATED APPLICATIONS

This application is a national phase filing under 35 U.S.C. 371 of International Application No. PCT/AU2012/000849, filed Jul. 13, 2012, which claims the benefit of and priority to Australian Provisional Patent Application No. 2011902814, filed Jul. 14, 2011, all of these applications are incorporated herein by reference in their entireties.

TECHNICAL FIELD

The present invention generally relates to communication systems, and in particular, to a method and device for configuring a communication system.

BACKGROUND ART

Each document, reference, patent application, or patent cited in this text is expressly incorporated herein in their entirety by reference, which means that it should be read and considered by the reader as part of this text. That the document, reference, patent application, or patent cited in this text is not repeated in this text is merely for reasons of conciseness.

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Fixed Mobile Convergence ("FMC") is a term used in the art for the integration of fixed and mobile networks to provide a single communication network foundation. For example, in an enterprise environment, FMC solutions can be applied to provide users with seamless services using a combination of fixed and mobile networks. By way of an example, a user may be engaged in a phone call on a mobile phone with another person via a mobile network. When the user enters an office (i.e., moves within the enterprise environment), the FMC can enable the phone call in progress on the mobile phone to be seamlessly handed over from the mobile network to the enterprise network (e.g., on a wireless Local Area Network ("LAN") via Voice over IP ("VoIP")). This can result in cost savings for the user as the phone call is being established on the enterprise network when within coverage instead of the mobile network operated by telephone companies.

In addition, FMC solutions can be applied to provide users with additional functionalities, such as call diversion, simultaneous ringing, and sequential ringing. The call diversion function allows a call in progress to be transferred from an office desk phone to a mobile phone and vice versa. The simultaneous ringing function allows an incoming call to a fixed line number to reach both the associated desk phone and mobile phone such that they ring simultaneously. The sequential ringing function allows an incoming call to a fixed line number to reach both the associated desk phone and mobile phone such that they ring sequentially. These functions assume that the mobile phone is within range of the enterprise network (e.g., enterprise's Wi-Fi network) and that the above-described call alerts and subsequent connections are made over the Wi-Fi network, rather than being transferred out to the mobile network.

However, although there are benefits associated with adopting FMC solutions in an enterprise environment as discussed above, there exist adoption barriers which may cause enterprises to either delay or decide against implementing FMC solutions.

For example, existing methods of deploying FMC solutions in an enterprise requires the manual re-programming of the enterprise's Private Branch Exchange ("PBX") to re-configure, for example, the call route table within the PBX. This manual re-programming task is often time-consuming and expensive as well as being error-prone. The need to manually re-program the PBX is driven mostly by the plethora of different PBX systems on the market today, whereby each PBX system has its particular individual configuration protocol and management interface.

As a result, the above factors may be sufficient to sway enterprises away from adopting FMC solutions and present barriers to large scale adoption of FMC solutions in general.

It is against this background that the present invention has been developed.

SUMMARY OF INVENTION

The present invention seeks to overcome, or at least ameliorate, one or more of the deficiencies of the prior art mentioned above, or to provide the consumer with a useful or commercial choice.

In accordance with a first broad aspect of the present invention, there is provided a method for configuring a communication system comprising an exchange, the method comprising:

identifying a type of the exchange;

selecting a configuration module adapted to communicate with the identified type of the exchange; and under the control of the selected configuration module, retrieving and analysing automatically a configuration database from the exchange, and configuring the exchange to provide communication connectivity to both a fixed network and a mobile network.

Preferably, the exchange comprises a Private Branch Exchange ("PBX"), a Private Automatic Branch Exchange ("PABX"), an Internet Protocol Private Branch Exchange (IP PBX) or an Internet Protocol Private Automatic Branch Exchange ("IP PABX").

Preferably, configuring the exchange comprises configuring the exchange to provide call routing between the fixed network and the mobile network.

Preferably, configuring the exchange comprises configuring the exchange to support call routing required to provide a service under Fixed Mobile Convergence.

Preferably, the type of the exchange is identified automatically under the control of a detection module.

Preferably, identifying a type of the exchange, under the control of the detection module, comprises:

sending a request to the exchange for triggering a response from the exchange;

receiving the response from the exchange; and verifying the response to determine whether the response matches an expected response to the request.

Preferably, the request comprises one or more executable instructions operable to identify a specific type of the exchange.

Preferably, the detection module is operable to access a plurality of different identifiers, each identifier comprising a request operable to identify a specific type of the exchange.

Preferably, said identifying a type of the exchange is repeated for each identifier of the plurality of different identifiers until either the response matches or corresponds to the expected response to the request of one of the identifiers or all of the plurality of different identifiers has been tested.

Preferably, when the response matches or corresponds with the expected response to the request, the type of the exchange is identified to be the type the request is operable to identify.

Preferably, retrieving the configuration data comprises retrieving a call routing database from the exchange; and configuring the exchange comprises modifying the call routing database and configuring the exchange with the modified call routing database.

Preferably, modifying the call routing database comprises incorporating additional call routing logic.

Preferably, the additional call routing logic supports call routing required to provide the service under the Fixed Mobile Convergence Preferably, incorporating additional call routing logic comprises linking a mobile number to a fixed extension number.

Preferably, the additional call routing logic is operable to divert an incoming call to a fixed device associated with the fixed extension number to a mobile device associated with the mobile number.

Preferably, the additional call routing logic is operable to divert the incoming call to the mobile device under the fixed network using the service provided under the Fixed Mobile Convergence.

Preferably, the additional call routing logic is operable to divert an internally originated call to the mobile device using the mobile number to the mobile device under the fixed network using the service provided under the Fixed Mobile Convergence when the mobile device is associated with the fixed extension number.

Preferably, the additional call routing logic is operable to route an incoming call to both a fixed device associated with the fixed extension number and a mobile device associated with the mobile number such that both the fixed and mobile device receive an incoming call alert simultaneously or sequentially.

Preferably, the additional call routing logic is operable to route an incoming call to the mobile device using the mobile number to both the mobile device and the fixed device associated with the mobile number under the fixed network using the service provided under the Fixed Mobile Convergence such that both the fixed and mobile devices receive an incoming call alert simultaneously or sequentially.

Preferably, the additional call routing logic is operable to route the incoming call to the mobile device under the fixed network using the service provided under the Fixed Mobile Convergence when the mobile device is detected to be within a coverage of the fixed network.

Preferably, the type of the exchange comprises a brand and/or a model of the exchange.

In accordance with a second broad aspect of the present invention, there is provided a device for configuring a communication system comprising an exchange, the device comprising a processor and a storage medium, the storage medium having a computer program comprising executable instructions stored thereon, whereby the processor is operable, under control of the computer program, to:

identify a type of the exchange;

select a configuration module adapted to communicate with the identified type of the exchange; and under the control of the selected configuration module, retrieve and analyse automatically a configuration database from the exchange, and configure the exchange to provide communication connectivity to both a fixed network and a mobile network.

Preferably, the exchange comprises a Private Branch Exchange ("PBX"), a Private Automatic Branch Exchange ("PABX"), an Internet Protocol Private Branch Exchange (IP PBX) or an Internet Protocol Private Automatic Branch Exchange ("IP PABX").

Preferably, the processor is operable to configure the exchange to provide call routing between the fixed network and the mobile network.

Preferably, the processor is operable to configure the exchange to support call routing required to provide a service under Fixed Mobile Convergence.

Preferably, the type of the exchange is identified automatically under control of a detection module.

Preferably, the processor, under the control of the detection module, is operable to:

send a request to the exchange for triggering a response from the exchange;

receive the response from the exchange; and verify the response to determine whether the response matches or corresponds with an expected response to the request.

Preferably, the request comprises one or more executable instructions operable to identify a specific type of the exchange.

Preferably, the processor, under the control of the detection module, is operable to access a plurality of different identifiers, each identifier comprising a request operable to identify a specific type of the exchange.

Preferably, the processor is operable to repeatedly identify the type of exchange for each identifier of the plurality of different identifiers until either the response matches or corresponds with the expected response to the request of one of the identifiers or all of the plurality of different identifiers has been tested.

Preferably, when the response matches the expected response to the request, the type of the exchange is identified to be the type the request is operable to identify.

Preferably, retrieving the configuration data comprises retrieving a call routing database from the exchange; and configuring the exchange comprises modifying the call routing database and configuring the exchange with the modified call routing database.

Preferably, modifying the call routing database comprises incorporating additional call routing logic.

Preferably, the additional call routing logic supports call routing required to provide the service under the Fixed Mobile Convergence.

Preferably, incorporating additional call routing logic comprises linking a mobile number to a fixed extension number.

Preferably, the additional call routing logic is operable to divert an incoming call to a fixed device associated with the fixed extension number to a mobile device associated with the mobile number.

Preferably, the additional call routing logic is operable to divert the incoming call to the mobile device under the fixed network using the service provided under the Fixed Mobile Convergence.

Preferably, the additional call routing logic is operable to divert an internally originated call to the mobile device using the mobile number to the mobile device under the fixed network using the service provided under the Fixed Mobile Convergence when the mobile device is associated with the fixed extension number.

Preferably, the additional call routing logic is operable to route an incoming call to both a fixed device associated with the fixed extension number and a mobile device associated with the mobile number such that both the fixed and mobile device receive an incoming call alert simultaneously or sequentially.

Preferably, the additional call routing logic is operable to route an incoming call to the mobile device using the mobile number to both the mobile device and the fixed device associated with the mobile number under the fixed network using the service provided under the Fixed Mobile Convergence such that both the fixed and mobile devices receive an incoming call alert simultaneously or sequentially.

Preferably, the additional call routing logic is operable to route the incoming call to the mobile device under the fixed network using the service provided under the Fixed Mobile Convergence when the mobile device is detected to be within a coverage of the fixed network.

Preferably, the type of the exchange comprises a brand and/or a model of the exchange.

In accordance with a third aspect of the present invention, there is provided a computer program product for configuring a communication system, the computer program product comprising computer executable instructions adapted to cause, when executed by a processing circuit, the processing circuit to perform the method according to the first broad aspect of the present invention as hereinbefore described.

Preferably, the computer program product comprises a computer-readable medium having stored thereon the computer executable instructions.

In accordance with a fourth aspect of the present invention, there is provided a computer program programmed to control a processing circuit to perform the method according to the first aspect of the present invention when executed by the processing circuit.

In accordance with a fifth broad aspect of the present invention, there is provided a computer-readable storage medium on which is stored instructions that, when executed by a computing means, causes the computing means to carry out the method according to the first broad aspect of the present invention as hereinbefore described.

In accordance with a sixth broad aspect of the present invention, there is provided a computing means programmed to carry out the method according to the first broad aspect of the present invention as hereinbefore described.

In accordance with a seventh broad aspect of the present invention, there is provided a data signal including at least one instruction being capable of being received and interpreted by a computing system, wherein the instruction implements the method according to the first broad aspect of the present invention as hereinbefore described.

In accordance with an eighth broad aspect of the present invention, there is provided a system comprising a device according to the second broad aspect of the present invention as hereinbefore described.

BRIEF DESCRIPTION OF THE DRAWINGS

In order that the invention may be more fully understood and put into practice, preferred embodiments thereof will now be described with reference to the accompanying drawings, in which:

FIG. 4 depicts a flow chart of an exemplary operation of a process for identifying a type of the exchange according to an embodiment of the present invention.

DESCRIPTION OF EMBODIMENTS

Figure 1:
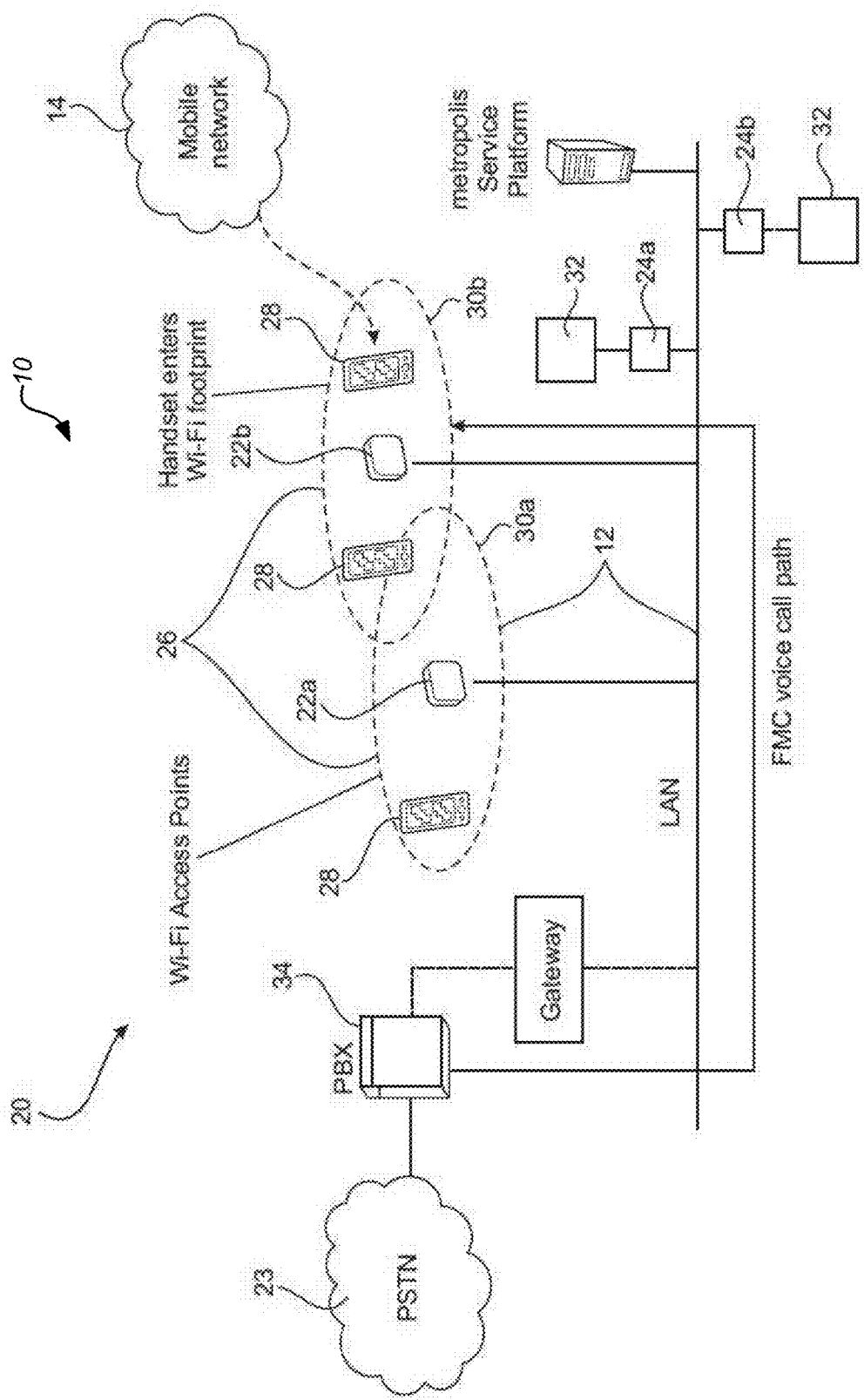
FIG. 1 depicts a schematic block diagram of an exemplary enterprise environment according to an embodiment of the present invention.

In the drawings, like features have been referenced with like reference numbers.

FIG. 1 illustrates an exemplary enterprise environment 10 according to an embodiment of the present invention comprising a fixed communication network 12 and preferably a mobile communication network 14. In the embodiment, the fixed network 12 comprises a Local Area Network ("LAN") providing wired and/or wireless connectivity to various devices within the enterprise. It should be appreciated that the fixed network 12 is not limited to the LAN and can be any type of communication network provided or operated by the enterprise or other entity. For example, instead of or in addition to the LAN, the fixed network 12 may include a Wide Area Network ("WAN"). The mobile network 14 can be any type of communication network. Such a network may be as provided by a telephone operator or company, including, for example, a Global System for Mobile ("GSM") network, a Code Division Multiple Access ("CDMA") network, a Long Term Evolution ("LTE") network or a WiMAX network. Further, the mobile network 14 can be of any generation of mobile telecommunications, such as 2G, 3G, 4G or any subsequent generations. Although the present invention will be described with particular reference to an enterprise environment 10, it should be appreciated that the invention may be applied to other types of environment, such as a home or public environment, without deviating from the scope of the present invention.

In the embodiment, there is provided a communication system 20 for providing or operating the fixed network 12. The communication system 20 comprises a number of access points 22a, 22b which are base stations for a multi-cell wireless network 26 for providing wireless connectivity, such as Wi-Fi, to one or more devices. For example, one or more mobile devices (or mobile station) 28 may be wirelessly connected to the wireless network 26 via one of the access points 22a, 22b. Preferably, the mobile devices 28 are wireless communication enabled devices 28 having dual-mode functionality capable of communicating with the fixed and mobile networks 12, 14. By way of example and without limitation, the mobile device 28 can be a smartphone such as that marketed under the trade mark iPhone® by Apple Inc. or BlackBerry® by Research In Motion Ltd. As another example, the mobile device 28 can be a portable computing device such as a laptop computer, a notebook computer or a tablet computer such as that marketed under the trade mark iPad® or iPod®Touch by Apple Inc or Galaxy Tab® by Samsung.

The access points 22a, 22b are configured and operable to transmit and receive signals for communication with the mobile device 28. The mobile device 28 is operable to establish a connection with one of the access points 22a, 22b as a gateway to gain access to a wider network. By way of example and without limitation, the wider network can be the World Wide Web ("WWW") and/or the Public Switched Telephone Network ("PSTN") 23. The access points 22a, 22b may be interconnected using wired or wireless technology such as wired or wireless Ethernet. Each access point 22a, 22b is operable to provide a characteristic amount of individual or corresponding network coverage (or cell) 30a, 30b in the vicinity thereof for the wireless network 26 as illustrated in FIG. 1. It should be appreciated that the network coverage provided by each access point 22a, 22b will depend on the type or manufacture of access point. For example, an 802.11n access point is estimated to be capable of providing an indoor range of about 30 m to 50 m.

In order for the mobile device 28 to communicate with the wireless network 26, the mobile device 28 needs to be located within the coverage of one of the cells 30a, 30b in order for the mobile device 28 to establish a connection with the corresponding access point 22a, 22b having sufficient signal strength. As a user moves between cells 30a, 30b, a handover of the mobile device's 28 connection from one access point (e.g., 22a) (which may be referred to as a "serving access point") to another access point (e.g., 22b) (which may be referred to as a "target access point") occurs to ensure a seamless connectivity with the wireless network 26.

The communication system 20 further comprises a number of access points 24a, 24b operable to provide wired or wireless connectivity to one or more devices. For example, one or more fixed devices (or fixed stations) 32 may be communicatively connected to the fixed network 12 via one of the access points 24a, 24b as a gateway to gain access to the wider network. By way of example and without limitation, the fixed device 32 can be a desk phone, a facsimile machine or a desktop computer which also includes a laptop computer or a notebook computer docked on a docking station.

If the access points 24a, 24b are operable to provide wired connectivity, such as a LAN socket, a cable is used to connect one of the access points 24a, 24b to one of the fixed devices 32. It should be appreciated that the cable can be of any type as long as it can function as a medium to facilitate communication, such as an optical cable, a coaxial cable, a twisted pair cable, a phone line or a power line, for example. If the access points 24a and 24b are operable to provide wireless connectivity, such as WLAN, they operate in the same or similar manner as the access points 22a, 22b described above and need not be repeated for conciseness.

An embodiment of the present invention will now be described with the mobile device 28 being a mobile phone and the fixed device 32 being a desk phone. It will be appreciated that the mobile device 28 and the fixed device 32 are not so limited and can be other types of devices for example as hereinbefore described.

In the embodiment, the communication system 20 further comprises an exchange or a switch station 34 for managing call switching and routing for the enterprise. By way of example and without limitation, the exchange 34 can be a Private Branch Exchange ("PBX"), a Private Automatic Branch Exchange ("PABX"), an Internet Protocol Private Branch Exchange (IP PBX) or an Internet Protocol Private Automatic Branch Exchange ("IP PABX"). For example, as illustrated in FIG. 1, the exchange 34 provides an interface between the PSTN 23 and each fixed device 32 for managing incoming calls to and outgoing calls from the fixed devices 32 with respect to the PSTN 23 or another fixed device 32 in the enterprise. As a result, fixed devices 32 in the enterprise share one (or more) external phone lines (or trunk lines) instead of requiring an individual external phone line for each fixed device 32 in the enterprise.

Each fixed device 32 in the enterprise has an associated unique number which is known in the art as an extension number (or fixed extension number). Typically, a plurality of fixed extension numbers is included in a conversion or routing table or database stored in the exchange 34. The exchange 34 is operable to manage the switching of calls based on the routing table or database. For instance, when the exchange 34 receives an incoming call containing a fixed extension number, the controller 34 looks up the routing table and connects the incoming call to the fixed device 34 linked with the fixed extension number. In embodiments of the invention, devices may be associated with identifiers other than, or additional to, a unique number.

Various components and functions of an exchange, such as a PBX or an IP PBX, are well known in the art and need not be described herein except as is relevant to the present invention.

The exchange 34 has hereinbefore been described with respect to performing call switching operations between fixed devices 32 and the PSTN 23 or between the fixed devices 32 in the enterprise via the fixed network 12. In the enterprise environment 10 for example, Fixed Mobile Convergence ("FMC") solutions can be deployed to provide users with seamless services using a combination of fixed and mobile networks 12, 14.

However, as discussed in the background of this invention, despite the benefits associated with adopting FMC solutions, there exist adoption barriers which may cause enterprises to either delay or decide against implementing FMC solutions. For example, existing methods of deploying FMC solutions in an enterprise requires the manual re-programming of the exchange 34 to re-configure, for example, the routing table within the exchange. This manual re-programming task is often time-consuming and expensive as well as being error-prone. As a result, such factors may be deemed by enterprises to outweigh the benefits associated with implementing FMC solutions and present barriers to large-scale adoption of FMC solutions in general.

Figure 2:
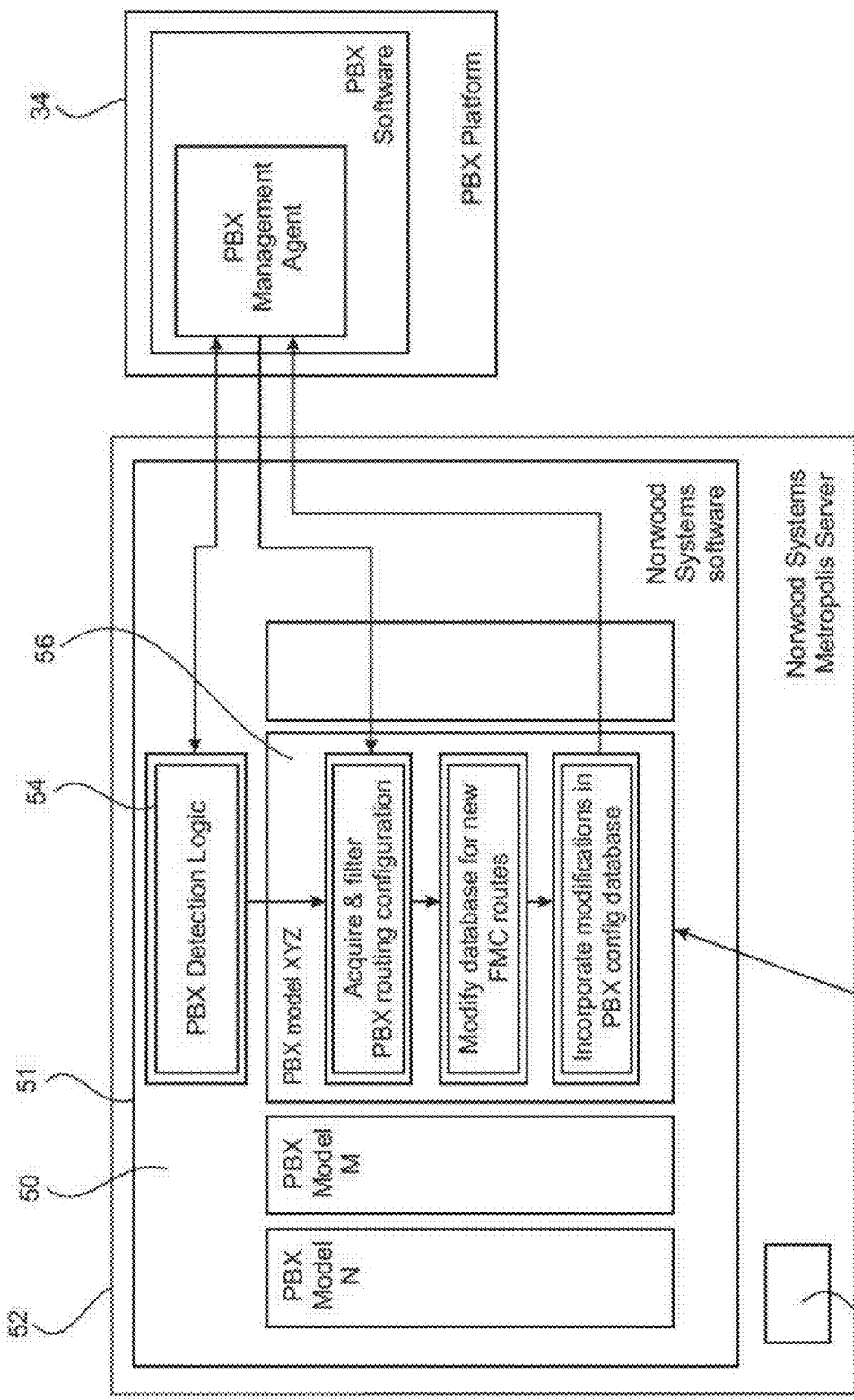
FIG. 2 depicts a schematic block diagram of a system (or device) and a program (or software) for configuring an exchange according to an embodiment of the present invention.

According to an embodiment of the present invention, there is provided a computer program (or software) 50 and a device (or system) 52 as depicted in FIG. 2 for configuring or programming a communication system 20 (and the associated method). In the embodiment, the program 50 and device 52 will be described with respect to configuring a communication system 20 to provide connectivity to both fixed and mobile networks 12, 14 (or FMC). However, it should be appreciate that the program 50 and device 52 are not limited to only making such a configuration to the communication system 20, and other variations and modifications to the embodiment described herein will be apparent to persons skilled in the art without departing from the scope of present invention.

In the embodiment, the program 50 comprises a set of instructions executable by a computer to cause the device 52 to configure the exchange 34 of the communication system 20 to provide connectivity to both fixed and mobile networks 12, 14. For example, when executed, the program 50 is operable to configure the exchange 34 to deploy or install FMC solutions in the communication system 20. In an embodiment, the program 50 is a Mobility Management Controller ("MMC") or a component thereof. The program 50 can be written in any suitable programming language so long as it performs the same or similar functions as described herein when executed by a computer or a data processing system.

In the embodiment, as illustrated in FIG. 2, the device 52 comprises a storage medium or means 51, such as a memory device, for storing the program 50 and a controller comprising a processor or processing means 53 operable, under the control of the program 50, to configure the exchange 34. The storage medium 51 can be of any type as long as it is capable of storing data or information (temporarily and/or permanently).

For example, the storage medium 51 can include volatile memory elements (e.g., random access memory ("RAM")) or non-volatile memory elements (e.g., read only memory ("ROM")), or a combination thereof. It should be appreciated that the program 50 (or parts thereof) need not be installed in the storage medium 51 of the device 52 and can instead be located in a storage medium remote from but accessible by the device 52.

The processor 53 can be of any type as long as it is capable of processing/executing instructions and/or managing the flow of data and information through the device 52. For example, the processor 53 can be any custom made or commercially available processor, a central processing unit ("CPU"), a data signal processor ("DSP"), a processing circuit or an auxiliary processor among several processors associated with the device 52. The processor 53 may be a semiconductor based microprocessor (in the form of a microchip) or a macroprocessor, for example. Furthermore, the interconnection between the processor 53 and other components of the device 52, such as the storage medium 51, is not shown in FIG. 2 as interconnecting such components is known to persons skilled in the art and need not be described herein or illustrated in the figures.

In one embodiment, the program 50 is hosted on a device 52 which is a server having stored therein the program 50 operable to configure the exchange 34. In this case, the device 52 may be communicatively connected to the exchange 34 via a wired interface (e.g., LAN), a wireless interface (e.g., WLAN) or a USB interface. In another embodiment, the program 50 is hosted on a virtual machine.

The program 50 provides at least a degree of automation in deploying FMC solutions to the communication system 20. With the program 50, the manual configuration or programming of the exchange 34 required when deploying FMC solutions is reduced or simplified. As a result, the time and/or costs of installing FMC solutions to a communication system 20 can be reduced, which can improve the adoption rate and market acceptance of FMC solutions in various environments such as in an enterprise.

Figure 3:
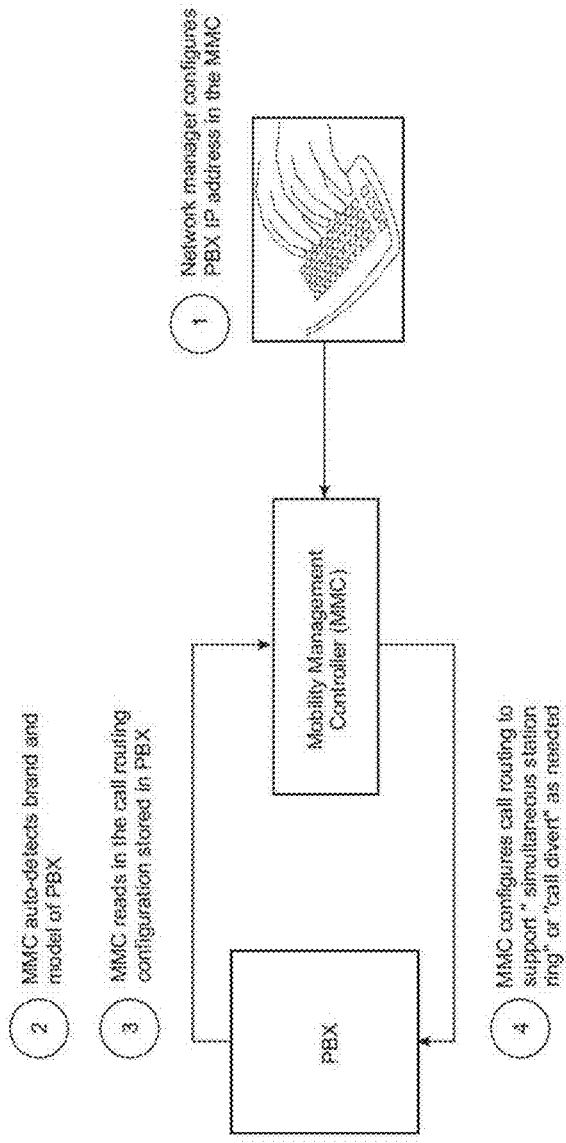
FIG. 3 depicts an overview of an exemplary process for configuring an exchange according to an embodiment of the present invention.

FIG. 3 illustrates an exemplary general overview of the operations of the device 52 under the control of the program 50 according to an embodiment of the present invention.

In the embodiment, as a first step, the device 52 is operable to establish a communication channel with the exchange 34 in order to facilitate ongoing communications therebetween. In the case whereby the device 52 and the exchange 34 are communicatively connected via LAN, an IP address of the exchange 34 will be required to establish the communication channel between the device 52 and the exchange 34. In an embodiment, the device 52 is operable to request and receive the IP address of the exchange 34 from a user input, for example, via a computer. When the IP address of the exchange 34 is received by the device 52, the device 52 is operable to establish the communication channel with the exchange 34 via LAN in a manner well known to the person skilled in the art and thus which need not be described.

In an embodiment, the device 52 is operable to request and receive an IP address associated with the Corporate Directory Server ("CDS") (e.g., a Lightweight Directory Access Protocol ("LDAP") directory server). The CDS comprises various types of information relating to the enterprise, such as employees' extension numbers and mobile numbers. Various components and functions of a CDS are well known in the art and need not be described herein except as is relevant to the present invention. When the IP address of the CDS is received by the device 52, the device 52 establishes a communication channel with the CDS and searches or scans the user directory to obtain user information, such as fixed extension numbers and the linked mobile numbers. In an alternative embodiment, a person may manually enter the user data into the device 52 to be stored in a local directory database of the program 50, including fixed extension number and the linked mobile number for each relevant user.

Once the communication channel between the device 52 and the exchange 34 has been established, as a second step, the device 52 under the control of the program 50 is operable to identify or detect one or more characteristics of the exchange 34. Preferably, the device 52 is operable to detect a type of the exchange 34, whereby the type comprises a brand (or manufacturer) and/or a model of the exchange 34.

Once the type of the exchange 34 has been identified or detected, as a third step, the device 52 under the control of the program 50 is operable to create or load a configuration module (or translation and configuration module) 56 for configuring the identified exchange 34. In the embodiment, the device 52 is operable to create or load a configuration module 56 adapted or specifically designed for communicating with the identified exchange 34 so as to enable the device 52 to configure the identified exchange 34. For example, from a library or collection of configuration modules 56, a configuration module 56 which is adapted or specifically designed for communicating with the identified exchange 34 is selected and loaded for managing ongoing communications with the identified exchange.

Once the configuration module 56 is created or loaded, the device 52 under the control of the configuration module 56 when executed is operable to configure the exchange 34 to provide connectivity to both fixed and mobile networks 12, 14, that is, to implement FMC solutions in the communication systems 20 of the enterprise.

By way of example and without limitation, the configuration module 56 may be operable to configure the exchange 34 such that incoming calls to a particular fixed device 32 are diverted to a linked mobile device 28. In this case, the configuration module 56 sends a first request to the exchange 34 to retrieve the call routing table of the exchange 34. Since the configuration module 56 is adapted or tailored for communicating with the identified exchange 34, the request issued by the configuration module 56 can be understood and executed by the exchange 34. When the configuration module 56 receives the call routing table, the call routing table is modified to implement the call diversion from a fixed device 32 to a linked mobile device 28. After the call routing table is modified, the configuration module 56 sends a second request to the exchange 34 to incorporate or implement the modified call routing table in the exchange 34.

It should be appreciated that the configuration module is not limited to only the above-described operation and can be operable to configure the exchange 34 in accordance with other FMC solutions, for example, "simultaneous ring" or "sequential ringing" for routing an incoming call to both the fixed device 32 and the mobile device 28 such that both the fixed and mobile device 28, 32 will receive an incoming call alert (e.g., ring) simultaneously or sequentially. Preferably, the additional call routing logic configured is operable to route the incoming call to the mobile device under the fixed network 12 (e.g. Wi-Fi) using a service provided under the FMC when the mobile device 28 is detected to be within a coverage of the fixed network 12. Further, when the mobile device 28 is detected to be within a coverage of the fixed network 12, the additional call routing logic configured is operable to route an incoming call to the mobile device 28 using the mobile number to both the mobile device 28 and the fixed device 32 associated with the mobile number under the fixed network 12 using a service provided under the FMC such that both the fixed and mobile devices receive an incoming call alert simultaneously or sequentially.

Accordingly, embodiments of the invention provide advantages including, for example, automatically setting up simultaneous/sequential ringing for a mobile device/desk phone extension based on mobile device presence or other signal or input from the user, automatically changing the routing plan based on presence in a new office location, automatically scanning an indial, range for free roam numbers to be assigned to roaming devices, automatically routing calls via roam numbers to devices on remote PBX locations, and providing a capability for inter-site roaming.

Therefore, the device 52 according to the embodiment reduces or simplifies the manual configuration or programming of the exchange 34 required when deploying FMC solutions. As a result, the time and/or costs of implementing FMC solutions to a communication system 20 can be minimised. For example, since the device 52 is able to automatically identify or detect the type of exchange and automatically load or create a configuration module suitable for managing ongoing communications with the exchange 34, the device 52 provides a single user-friendly platform (or a number of similar or related platforms) for deploying FMC solutions across a large number of supported different exchanges.

The computer program or software 50 will now be described in further detail with reference to FIG. 2. In an embodiment, the program 50 comprises a detection module or means 54 and a configuration module or means 56.

The detection module 54 is operable to identify or detect the type of the exchange 34 to be configured. The detection module 54 comprises or has access to a library or collection of identifiers, each designed to identify or detect a specific type of exchange 34. In an embodiment, the identifier comprises one or more instructions or requests to be executed by the exchange 34, along with an expected response. For example, the identifier may be a protocol test or a configuration request structure.

FIG. 4 is a flow diagram illustrating an operation of the detection module 54 according to an embodiment of the present invention.

As a first step, the detection module 54 retrieves an identifier from the library of identifiers. The detection module 54 sends a request included in the retrieved identifier to the exchange 34 to trigger a response from the exchange 34 and then awaits a response from the exchange 34. When the detection module 54 receives a response from the exchange 34, the detection module 54 verifies or tests whether the response matches or corresponds to the expected response of a type of exchange 34. If the response is valid and/or matches with the expected response, the type of the exchange 34 has been identified and the detection module 54 sends identification information indicating the type of the exchange 34 for the program 50. Otherwise, the detection module 54 retrieves another identifier from the library if available and the process repeats until either the exchange 34 is identified or all available identifiers from the library have been tested. In the event that all available configuration request structures from the library have been tested but no response is valid or provides a match, the type of exchange 34 remains unknown. In this case, according to an embodiment, the program 50 is operable to detect another gateway, such as a third party VoIP gateway, and if found, the program 50 is operable to configure the detected gateway to implement FMC solutions.

Assuming that the type of the exchange 34 is identified, based on the identification information, the program 50 loads a configuration module 56 adapted or specifically designed to communicate with the identified exchange 34. For example, as exemplified in FIG. 2, the type of the exchange 34 is identified as type "XYZ". Therefore, a configuration module 56 specifically designed for communication with type "XYZ" exchange 34 is loaded and used as an interface for managing ongoing communications with the identified exchange 34 to configure the type "XYZ" exchange 34.

According to the embodiment as illustrated in FIG. 2, the configuration module 56 is operable to perform the following functions in general in configuring the exchange 34 to support FMC solutions:

acquiring the call routing database from the exchange 34;
modifying the acquired call routing database to incorporate FMC routing logic per relevant user; and
re-programming the exchange 34 using the modified configuration.

Although the program 50 has hereinbefore been classified into two modules, namely, a detection module 54 and a configuration module 56, it should be appreciated that the program 50 may comprise more or less modules without deviating from the scope of the present invention.

According to an embodiment, the program 50 is developed using a CentOS Virtual Machine platform initially targeting the Cisco Unified Communications Manager ("CUCM") based IP PBX environment.

The content and subject matter of Australian Provisional Patent Application 2011902807 titled "Method and System for Determining Topology of a Wireless Communication Network" filed on 14 Jul. 2011 and the International Patent Application claiming priority therefrom filed by the Applicant on the same day as the present International Patent Application are expressly incorporated herein in their entirety by reference, which means that they should be read and considered by the reader as part of this text and are not repeated in this text merely for reasons of conciseness. The inventions the subject of the applications may be used together or combined in embodiments relating to FMC to allow for FMC solutions to be installed or deployed with reduced or minimum manual configuration, thereby moving towards zero human intervention.

In an embodiment of the present invention, there is provided a computer program product comprising computer-executable instructions adapted to cause, when executed by a data processing system (or a processing circuit), the data processing system (or the processing circuit) to perform the method or operations as hereinbefore described with respect to the computer program 50. By way of example and without limitations, the computer program product may be embodied as a computer-readable medium having stored thereon the computer-executable instructions. For example, the computer-readable medium may be an optical disc, such as a Compact Disc ("CD"), a Digital Versatile Disc ("DVD") or a Blu-Ray Disc ("BD"), a diskette, a magnetic storage medium, a memory stick, or the like.

Accordingly, according to embodiments of the present invention, the manual configuration or programming of the exchange 34 required when deploying FMC solutions can be reduced or simplified. As a result, the time and/or costs of installing FMC solutions to a communication system 20 is reduced, which can improve the adoption rate and market acceptance of FMC solutions in various environments such as in an enterprise.

Although the present invention has been described hereinbefore with particular applicability to FMC scenarios, it should be appreciated that the present invention can also be applied to non-FMC scenarios, for example, centralised directory management and policy-based management of exchange (e.g., PBX) platforms within an enterprise.

It will be appreciated by those skilled in the art that modifications and variations to the invention described herein will be apparent departing from the spirit and scope thereof. The variations and modifications as would be apparent to persons skilled in the art are deemed to fall within the broad scope and ambit of the invention as herein set forth.

Throughout the specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including", will be understood to imply the inclusion of a stated integer or group of integers but not the exclusion of any other integer or group of integers.

Additionally, throughout the specification, unless the context requires otherwise, the words "substantially" or "about" will be understood to not be limited to the value for the range qualified by the terms.

Where the words "store", "hold" and "save" or similar words are used in the context of the present invention, they are to be understood as including reference to the retaining or holding of data or information both permanently and/or temporarily in a storage means, device or medium for later retrieval, and momentarily or instantaneously, for example as part of a processing operation being performed.

Additionally, where the terms "system" and "device" are used in the context of the present invention, they are to be understood as including reference to any group of functionally related or interacting, interrelated, interdependent or associated components or elements that may be located in proximity to, separate from, integrated with, or discrete from, each other.

Additionally, in embodiments of the invention, the word "determining" is understood to include receiving or accessing the relevant data or information.

The invention claimed is:

1. A method for configuring a communication system, the method comprising:
   automatically and under the control of a detection module, identifying a type of an exchange amongst a plurality of exchange types by sending a request to the exchange for triggering a response from the exchange, receiving the response from the exchange and verifying the response to determine whether the response matches an expected response to the request;
   selecting a configuration module adapted to communicate with the identified type of the exchange; and
   under the control of the selected configuration module, retrieving and analysing automatically call routing data from the exchange, linking a mobile number to a fixed device associated to a fixed extension number and configuring the exchange to provide communication connectivity for a single device to both a fixed network and a mobile network and to support call routing required to provide a service under a Fixed Mobile Convergence;
   wherein the call routing is operable to route an incoming call to a mobile device using the mobile number to both the mobile device and the fixed device associated with the mobile number under the fixed network using the service provided under the Fixed Mobile Convergence such that both the fixed device and mobile device receive an incoming call alert simultaneously or sequentially.

2. The method according to claim 1, wherein the exchange comprises a Private Branch Exchange ("PBX"), a Private Automatic Branch Exchange ("PABX"), an Internet Protocol Private Branch Exchange (IP PBX) or an Internet Protocol Private Automatic Branch Exchange ("IP PABX").

3. The method according to claim 1, wherein configuring the exchange comprises configuring the exchange to provide call routing between the fixed network and the mobile network.

4. The method according to claim 1, wherein the request comprises one or more executable instructions operable to identify a type of the exchange.

5. The method according to claim 1, wherein the detection module is operable to access a plurality of different identifiers, each identifier comprising a request operable to identify a specific type of the exchange.

6. The method according to claim 5, wherein said identifying a type of the exchange is repeated for each identifier of the plurality of different identifiers until either the response matches or corresponds to the expected response to the request of one of the identifiers or all of the plurality of different identifiers has been tested.

7. The method according to claim 1, wherein when the response matches the expected response to the request, the type of the exchange is identified to be the type the request is operable to identify.

8. The method according to claim 1, wherein
   configuring the exchange further comprises modifying a call routing database of the call routing data and
   configuring the exchange with the modified call routing database.

9. The method according to claim 8, wherein the additional call routing logic is operable to route another incoming call to both the fixed device associated with the fixed extension number and the mobile device associated with the mobile number such that both the fixed and mobile devices receive another incoming call alert simultaneously or sequentially.

10. The method according to claim 8, wherein the additional call routing logic is operable to route the incoming call to the mobile device under the fixed network using the service provided under the Fixed Mobile Convergence when the mobile device is detected to be within a coverage of the fixed network.

11. The method according to claim 8, wherein the additional call routing logic is operable to divert another incoming call to the fixed device associated with the fixed extension number to the mobile device associated with the mobile number.

12. The method according to claim 11, wherein the additional call routing logic is operable to divert another incoming call to the mobile device under the fixed network using the service provided under the Fixed Mobile Convergence.

13. The method according to claim 11, wherein the additional call routing logic is operable to divert an internally originated call to the mobile device using the mobile number to the mobile device under the fixed network using the service provided under the Fixed Mobile Convergence when the mobile device is associated with the fixed extension number.

14. The method according to claim 1, wherein the type of the exchange comprises either or both a brand and a model of the exchange.

15. A device for configuring a communication system, the device comprising: a processor and a memory whereby the processor is configured to:
   automatically and under the control of a detection module, identify a type of an exchange amongst a plurality of exchange types by sending a request to the exchange for triggering a response from the exchange, receiving the response from the exchange and verifying the response to determine whether the response matches an expected response to the request;
   select a configuration module adapted to communicate with the identified type of the exchange; and
   under the control of the selected configuration module, retrieve and analyse automatically call routing data from the exchange, linking a mobile number to a fixed device associated to a fixed extension number and configure the exchange to provide communication connectivity for a single device to both a fixed network and a mobile network and to support call routing required to provide a service under a Fixed Mobile Convergence;
   wherein the call routing is operable to route an incoming call to a mobile device using the mobile number to both the mobile device and the fixed device associated with the mobile number under the fixed network using the service provided under the Fixed Mobile Convergence such that both the fixed and mobile devices receive an incoming call alert simultaneously or sequentially.

16. The device according to claim 15, wherein the exchange comprises a Private Branch Exchange ("PBX"), a Private Automatic Branch Exchange ("PABX"), an Internet Protocol Private Branch Exchange (IP PBX) or an Internet Protocol Private Automatic Branch Exchange ("IP PABX").

17. The device according to claim 15, wherein the processor is operable to configure the exchange to provide call routing between the fixed network and the mobile network.

18. The device according to claim 15, wherein the request comprises one or more executable instructions operable to identify a specific type of the exchange.

19. The device according to claim 15, wherein the processor, under the control of the detection module, is operable to access a plurality of different identifiers, each identifier comprising a request operable to identify a specific type of the exchange.

20. The device according to claim 19, wherein the processor is operable to repeatedly identify the type of exchange for each identifier of the plurality of different identifiers until either the response matches or corresponds with the expected response to the request of one of the identifiers or all of the plurality of different identifiers has been tested.

21. The device according to claim 15, wherein when the response matches the expected response to the request, the type of the exchange is identified to be the type the request is operable to identify.

22. The device according to claim 15, wherein:
   configuring the exchange further comprises modifying a call routing database of the call routing data and configuring the exchange with the modified call routing database.

23. The device according to claim 22, wherein the additional call routing logic is operable to divert another incoming call to the fixed device associated with the fixed extension number to the mobile device associated with the mobile number.

24. The device according to claim 22, wherein the additional call routing logic is operable to divert another incoming call to the mobile device under the fixed network using a service provided under the Fixed Mobile Convergence.

25. The device according to claim 22, wherein the additional call routing logic is operable to divert an internally originated call to the mobile device using the mobile number to the mobile device under the fixed network using the service provided under the Fixed Mobile Convergence when the mobile device is associated with the fixed extension number.

26. The device according to claim 22, wherein the additional call routing logic is operable to route another incoming call to both the fixed device associated with the fixed extension number and the mobile device associated with the mobile number such that both the fixed device and the mobile device receive another incoming call alert simultaneously or sequentially.

27. The device according to claim 22, wherein the additional call routing logic is operable to route the incoming call to the mobile device under the fixed network using the service provided under the Fixed Mobile Convergence when the mobile device is detected to be within a coverage of the fixed network.

28. The device according to claim 15, wherein the type of the exchange comprises either or both a brand and a model of the exchange.

29. A non-transitory computer-readable medium on which is stored instructions that, when executed by a processor, causes the processor to carry out the method of:
   automatically and under the control of a detection module, identifying a type of an exchange amongst a plurality of exchange types by sending a request to the exchange for triggering a response from the exchange, receiving the response from the exchange and verifying the response to determine whether the response matches an expected response to the request;
   selecting a configuration module adapted to communicate with the identified type of the exchange; and
   under the control of the selected configuration module, retrieving and analysing automatically call routing data from the exchange, linking a mobile number to a fixed device associated to a fixed extension number and configuring the exchange to provide communication connectivity for a single device to both a fixed network and a mobile network and to support call routing required to provide a service under a Fixed Mobile Convergence;
   wherein the call routing is operable to route an incoming call to a mobile device using the mobile number to both the mobile device and the fixed device associated with the mobile number under the fixed network using the service provided under the Fixed Mobile Convergence such that both the fixed and mobile devices receive an incoming call alert simultaneously or sequentially.

30. The non-transitory computer-readable medium according to claim 29, wherein the exchange comprises a Private Branch Exchange ("PBX"), a Private Automatic Branch Exchange ("PABX"), an Internet Protocol Private Branch Exchange (IP PBX) or an Internet Protocol Private Automatic Branch Exchange ("IP PABX").

31. The non-transitory computer-readable medium according to claim 29, wherein configuring the exchange comprises configuring the exchange to provide call routing between the fixed network and the mobile network.

32. The non-transitory computer-readable medium according to claim 29, wherein the request comprises one or more executable instructions operable to identify a type of the exchange.

33. The non-transitory computer-readable medium according to claim 29, wherein the detection module is operable to access a plurality of different identifiers, each identifier comprising a request operable to identify a specific type of the exchange.

34. The non-transitory computer-readable medium according to claim 33, wherein said identifying a type of the exchange is repeated for each identifier of the plurality of different identifiers until either the response matches or corresponds to the expected response to the request of one of the identifiers or all of the plurality of different identifiers has been tested.

* * * * *